United States Patent Office 2,930,337
Patented Mar. 29, 1960

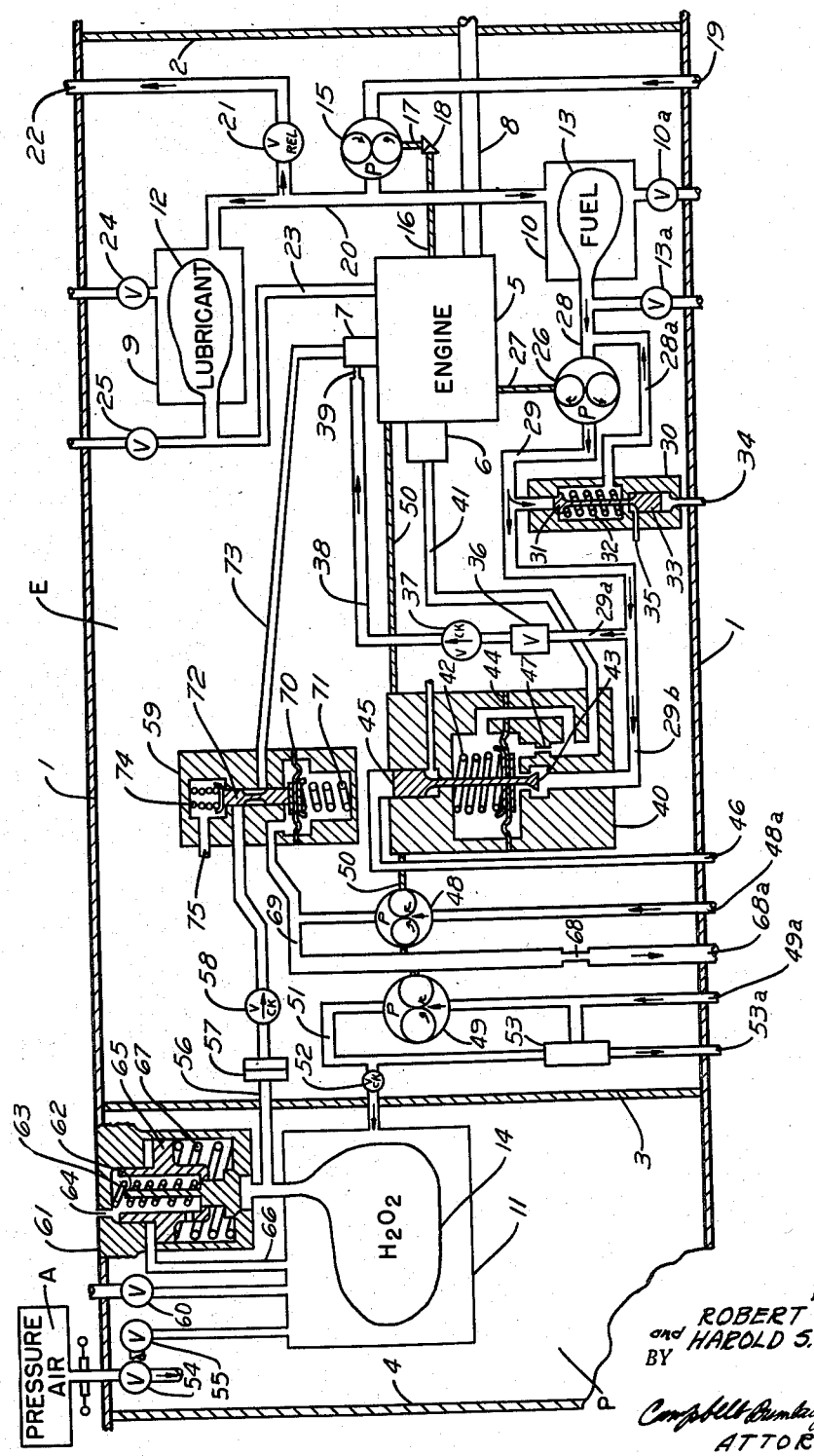

2,930,337

PROPULSION MOTOR

Robert Perrier, Farmingdale, N.Y., and Harold S. Mickley, Belmont, Mass., assignors to Fairchild Engine and Airplane Corporation, Farmingdale, N.Y., a corporation of Maryland Application January 12, 1952, Serial No. 266,218

18 Claims. (Cl. 114—20)

This invention relates to propulsion power plants for dirigible craft and has particular reference to propulsion power plants for automobile submarine torpedoes, although the invention is not limited to that use.

The motive means heretofore employed for propelling submarine torpedoes comprised either electric motors, or steam turbines or internal combustion engines employing liquid oxygen or compressed air as the oxidant, and some hydrocarbon fuel. The practicability of electrically driven torpedoes is limited by their short range and inordinately high operating cost and, although torpedoes driven by turbines or internal combustion engines have a relatively long effective range, they are incapable of operating at such great depths as 1000 feet and more, at which combat submarines are expected to operate.

In accordance with the present invention, a self-contained power plant particularly adapted for automobile submarine torpedoes is provided, which is capable of accurate and effective operation at depths of 1000 feet and more and which operates efficiently and uniformly for a substantial period of time to accurately propel torpedoes to targets situated at great distances.

The submarine torpedo propulsion power plant of this invention comprises an internal combustion engine driven by the combustion of hydrocarbon fuel in the presence of oxygen and steam obtained as the products of the catalytic decomposition of hydrogen peroxide, the mixture of oxygen and other decomposition product, steam, being preheated to the point of self-ignition of the fuel by burning a small amount of fuel in the oxygen of such mixture prior to its introduction into the combustion chamber of the engine. The supply of engine fuel and the preheated decomposition products of hydrogen peroxide to the engine is regulated jointly in accordance with the engine speed and water pressure at the operating depth of the torpedo to maintain constant speed at any operating depth, the said regulation being effected by governing mechanism responsive to the differential pressure between the output of an engine-driven hydraulic pump and the pressure of the water surrounding the torpedo as measured at a fixed orifice. The fuel is similarly supplied in metered amounts which is determined in accordance with engine speed and depth of submersion. Novel starting mechanism, oxidant, fuel and lubricant supply means and other features of the propulsion power plant of this invention will become apparent from the following detailed description thereof taken with the accompanying drawing which is a schematic diagram thereof as embodied in the hull of a submarine torpedo.

Referring to the drawing, numeral 1 designates the hull of the torpedo which is subdivided into compartments by transverse bulkheads, three of which are shown in the drawing and identified by numerals 2, 3 and 4.

Bulkheads 3 and 4, together with the hull 1, form the forward compartment P which houses the hydrogen peroxide supply equipment. Similarly, bulkheads 2 and 3, together with the hull 1, form the engine compartment E.

It will be understood that the navigational control mechanisms, buoyancy and ballast tanks, explosive, detonating and aiming mechanisms, and other equipment common to a submarine torpedo will be housed elsewhere within the hull 1 and, since they form no part of the present invention, they need not be described.

Suitably mounted within the engine compartment E is the engine 5 which is an internal combustion engine of known construction, preferably of the reciprocating type, although it may be a gas turbine. The engine 5 operates on decomposed hydrogen peroxide and hydrocarbon fuel, which are supplied to it in accordance with the present invention. The fuel is distributed to the cylinders or other combustion space of the engine 5 from a fuel distributor 6 and the hydrogen peroxide is fed to the combined decomposition chamber and preburner 7, to which a regulated amount of fuel also is supplied for combustion in part of the decomposition oxygen for the purpose of preheating the decomposition mixture of oxygen and steam to the self-ignition point of the fuel in the cylinders of the engine 5. The engine 5 drives the propeller shaft 8 which extends aft to the propeller or propellers of the torpedo.

The lubricant for the engine 5 is stored in tank 9, the engine fuel in tank 10, both located in the engine compartment E, while the hydrogen peroxide is stored in tank 11 within the compartment P. The lubricant, fuel and hydrogen peroxide are sealed in their respective tanks 9, 10 and 11 by means of collapsible bags 12, 13 and 14, respectively. These bags are formed of polyvinyl chloride, polyethylene or other flexible material which is inert to the liquids contained therein, particularly bag 14 containing the hydrogen peroxide.

The lubricant in bag 12 and the fuel in bag 13 are expressed therefrom by hydraulic pressure supplied exteriorly thereof by pipe 20 leading to respective tanks 9 and 10 from pump 15 which draws sea water from outside of hull 1 through pipe 19. Pump 15 may be a gear pump, as shown, and is directly driven from engine 5 by shafts 16 and 17 and connecting gearing 18.

Although the pressure at the outlet of pump 15 is proportional to the speed of the engine 5, the pressure of the water delivered to the tanks 9 and 10 is maintained constant relative to the external water pressure, regardless of the speed of the engine 5, by means of a pressure relief valve 21 in pipe 22 connecting pipe 20 to the exterior of the hull 1. Relief valve 21 is set to open automatically when the water pressure in conduit 20 exceeds a predetermined pressure, and the excess water passed by valve 21 is dumped overboard. In order to maintain a constant pressure on bags 12 and 13 in tanks 9 and 10, the relief valve 21 is set to pass some water at all times during operation of the engine 5.

Filling of lubricant bag 12 is effected exteriorly of the hull 1 through normally closed valve 25 and tank 9 is vented through valve 24 during the filling of bag 12 to enable it to expand. Similarly, filling of fuel bag 13 is effected exteriorly of the hull 1 through normally closed valve 13a and tank 10 is vented through valve 10a during such filling.

During operation of the engine, lubricant is supplied thereto at constant pressure relative to the external water pressure through conduit 23 by reason of the constant hydraulic pressure applied to bag 12 within its tank 9 in the manner described.

The fuel discharged from bag 13 by the constant water pressure in tank 10 is supplied by conduit 28 to the intake of a pump 26, such as the gear pump shown as being driven from engine 5 by shaft 27. The pressure of the fuel discharged by pump 26 is regulated by depth-compensated relief valve 30, which consists essentially of a conventional poppet valve 31 held in the closed position by spring 32 and caused to open whenever the pressure in conduit 29 exceeds the opposing pressure of said spring 32. In order to maintain the pressure of the fuel in conduit 29 at a constant degree above that of the ambient pressure of water outside the torpedo hull 1, a piston 33 is provided to increase the opening pressure on valve 31 as the torpedo descends to a grater depth in the water. Piston 33 is subjected to ambient water pressure through conduit 34 and increases the pressure on valve 31 by an amount equal to the external water pressure. The body of valve 30 is provided with a vent 35 leading from the unloaded side of piston 33 to the engine compartment E which is under atmospheric pressure to conduit 28.

The fuel at a constant pressure above that of the surrounding water flows through conduit 29 and branch conduit 29a to pressure regulating valve 36 which is of conventional construction and which maintains a constant fuel pressure regardless of depth, thence through check valve 37 through conduit 38 and constricted orifice 39 to the preburner 7. The pressure control system provided by valves 36 and 37 and orifice 39 insures a flow of fuel to preburner 7 to maintain a relatively constant temperature of the decomposition products issuing therefrom, regardless of the depth at which the torpedo is operating. Preburner 7 comprises a combustion chamber in which a sufficient amount of fuel is burned to insure complete dissociation of the hydrogen peroxide and provide a sufficiently high intake manifold temperature to insure auto ignition of fuel injected into the cylinders, as will be described.

Fuel in conduit 29 also flows by branch conduit 29b to valve 40 which regulates it so as to provide an increase in the flow of fuel as the operating depth of the torpedo is increased. Specifically, valve 40 delivers fuel through conduit 41 to a conventional engine-driven fuel distributor 6 at a pressure maintained at a constant degree above that of the external water pressure. Valve 40 consists essentially of a poppet valve 43 normally urged toward open position by spring 42 which is opposed by the counter pressure of balanced diaphragm 44, and is compensated for external water pressure by piston 45 which is subject to such pressure through conduit 46 leading out through the hull 1. Fuel passing valve 43 flows through fuel metering orifice 47 through the aforementioned conduit 41 to fuel distributor 6. Any increase of pressure in conduit 29 above that required to provide the required fuel flow at any given depth will cause poppet valve 43 to close, thereby shutting off the supply of fuel to distributor 6 until the normal operating fuel pressure and flow for that depth is reestablished. Further details of the construction of valve 40 as well as of valve 30 are disclosed in copending application Serial No. 327,584, filed December 23, 1952 (now abandoned).

The hydraulic pressure used to supply hydrogen peroxide from bag 14 is supplied to tank 11 by water pump 49 which receives sea water through conduit 49a and is driven by engine 5 through shaft 50. Water pump 49 delivers water under pressure through conduit 51 and check valve 52 to tank 11. The water pressure in conduit 51 is maintained at a constant degree above that of the external water pressure by a depth-compensated relief valve 53, which receives its external compensating water pressure through conduit 53a and is similar in construction and operation to previously-described valve 30.

The compartment P housing the hydrogen peroxide tank 11 contains air under pressure of approximately 600 p.s.i.g. which is received through valve 54 from a suitable external source A temporarily coupled thereto when the torpedo is prepared for operation. When it is desired to start the torpedo in operation, valve 55 is opened to admit high pressure air from compartment P to tank 11 wherein it exerts pressure on bag 14, causing hydrogen peroxide to flow through conduit 56, which is normally closed by a frangible membrane type of rupture disc 57 to insure that the peroxide does not enter the power plant system while the torpedo is inoperative. This provision is necessary in order to avoid fire or explosion or decomposition of the peroxide. As peroxide flows through conduit 56 from bag 14 under high pressure, it ruptures disc 57 and allows the normal flow to occur through check valve 58 to peroxide control valve 59.

The speed of engine 5 is controlled by regulating the flow of peroxide through valve 59, which, in combination with pump 48 and orifice 68, operates as a hydraulic speed governor. Pump 48 is driven by shaft 50 from engine 5 and draws sea water through conduit 48a and delivers water under pressure to conduit 69 leading to valve 59 and orifice 68 in branch conduit 68a discharging through the hull 1. With the pump 48 driven at any constant speed, a constant discharge of water through orifice 68 will occur at any given depth and hence a constant gauge pressure will exist in conduit 69 at that depth. Should the engine and consequently the speed of pump 48 increase, the pressure in conduit 69 will be raised, thereby causing diaphragm 70 in valve 59 to deflect against the pressure of spring 71a and allow piston valve 72 to partially close off peroxide conduit 56, thereby decreasing the flow of peroxide through conduit 73 to decomposition chamber 7. Conversely, should the speed of engine 5 and consequently of pump 48 decrease, the pressure in conduit 69 will be lowered, thereby allowing spring 71 to move diaphragm 70 and piston valve 72 toward open position to increase the flow of peroxide through valve 59 and conduit 73 to decomposition chamber 7. Spring 74 is provided merely to move piston valve 72 downwardly whenever diaphragm 70 is deflected in that direction, and the pressure in the spring 74 chamber is equalized through vent 75 with the atmospheric pressure existing in the engine compartment E.

Bag 14 is filled with hydrogen peroxide from outside of hull 1 through peroxide fill and vent valve 61 which is removed when filling bag 14 and is installed at all other times. During filling of bag 14, air valve 55 is closed and vent valve 60 for tank 10 is opened. Since some decomposition of peroxide may occur while the torpedo is inoperative or in storage, it is necessary to allow the decomposed gas, consisting mainly of oxygen, to escape to the atmosphere through valve 61. The gas pressure reaches a point where it opens poppet valve 62 against the pressure of spring 63 to allow the gas to escape through vent 64 to the atmosphere. Although valve 62 is required to vent gasses resulting from auto decomposition of the peroxide in bag 14, valve 62 must be held in closed position whenever the torpedo is in operation and peroxide is being discharged from bag 14 to the power plant system. In order to insure closing of valve 62, a piston 65, normally held in its inoperative position by spring 67, is acted upon on its upper side by air pressure received through conduit 66 from tank 11. Thus, when valve 55 is opened to prepare the torpedo for operation, air pressure forces piston 65 downward against valve 62 causing the latter to remain closed and allow peroxide to flow into the power plant system through conduit 56.

It will be understood that valves 10a, 13a, 24, 25, 54 and 60 may be removable plugs sealed in the wall of hull 1, and that the various external controls are suitably sealed in accordance with known practice.

Although the operation of the torpedo propulsion power plant system of this invention will be understood from the foregoing description, a brief summary of a typical operation sequence will be helpful to a complete understanding of the effectiveness and efficiency of the system. In preparing the system for operation, collapsible bag 12 is filled with lubricant from an external source through open valve 25 while vent valve 24 of tank 9 is open. Similarly, collapsible bag 13 is filled with suitable fuel, such as diesel oil, from an external source through valve 13a while vent valve 10a of surrounding tank 10 is open. Valve 61 is entirely removed and hydrogen peroxide of a concentration on the order of 80% from an external source filled into collapsible bag 14 while the vent valve 60 for tank 11 is open to atmosphere. When bag 14 is filled with hydrogen peroxide, valve 61 is screwed into place in the aperture provided therefor in the hull 1.

The pressure air for causing the flow of hydrogen peroxide from bag 14 to the engine 5 is then forced into compartment P from external source A until the air pressure in compartment P reaches about 600 p.s.i.g., whereupon valve 54 is closed and the air pressure source A disconnected therefrom. In order to start the engine 5, valve 55 is opened upon launching the torpedo, preferably by a trip mechanism actuated upon release of the torpedo, to allow pressure air from compartment P to enter tank 11 and express hydrogen peroxide from bag 14 into conduit 56 where its high pressure ruptures diaphragm 57 to admit peroxide through check valve 58 and peroxide flows through control valve 72, which is initially held fully open by spring 71 in the absence of compensating water pressure before launching. Hydrogen peroxide is thus supplied to decomposition chamber 7. The high pressure decomposition products, pressurized initially by the compressed air in compartment P enter the engine cylinders and cause the engine to start as a simple expansion engine and continue operating as such until fuel flow is established.

The water pressure generated by pump 15 causes the application of sufficient hydraulic pressure to bag 13 to cause fuel to flow through conduits 28, 29 and 29b through valve 43 held open by spring 42, orifice 47 and conduit 41 to the fuel distributor 6 of engine 5. Similarly, the hydraulic pressure in tank 9 expresses bag 12 to supply lubricant through conduit 23 to engine 5.

Starting of the engine drives pumps 15, 26, 48 and 49. Valves 10a and 24 are closed to allow pump 15 to apply constant pressure to bags 12 and 13 and thus supply lubricant and fuel therefrom, the pressure on bags 12 and 13 being maintained constant by the operation of pressure relief valve 21.

Similarly, the operation of pump 49 causes water to be pumped into tank 11, to express the peroxide from bag 14. The operation of pump 26 results in the supply of a small amount of fuel from conduit 29a through valves 36 and 37 and orifice 39 to combined catalyzer and preburner 7 where the fuel is ignited by the high temperature decomposition products and is burned in part of the oxygen of decomposition to heat the decomposition mixture of oxygen and steam to the degree that it causes autoignition of the fuel in the engine 5, whereupon the engine operates automatically on the oxidant and fuel charge supplied thereto.

In its course toward the target to which it is directed, the torpedo depth automatically regulates the flow of fuel jointly by the pressure of pump 26 driven by engine 5 and the water pressure beyond the orifice 47 in valve 40 which increases the flow of fuel as the torpedo depth increases and vice versa, whereby a constant torpedo speed is maintained in cooperation with a similar control of the hydrogen peroxide supply.

The supply of hydrogen peroxide is similarly regulated in accordance with the depth of submersion of the torpedo. This is effected by the mechanism including the two engine-driven pumps 48 and 49, the hydraulic orifice 68 and the flow control valve 59, operating in the manner previously described. Thus, as the depth of the torpedo increases, the greater hydraulic pressure applied to the bag 14 through valve 53 and to diaphragm 70 of valve 59 through orifice 68, results in a greater flow of peroxide to the decomposition-preburner chamber 7 to support the combustion of the greater supply of fuel in the engine 5.

In this way, the engine operation is regulated precisely in accordance with depth of submersion of the torpedo so that the torpedo is driven at constant speed at any depth and is thereby enabled to operate at great depths, on the order of 1000 feet and more.

Although a preferred embodiment of the invention has been illustrated and described herein, it is to be understood that the invention is not limited thereby, but is susceptible to changes in form and detail within the scope of the appended claims.

We claim:

1. In combination with a combustion engine for propelling a submarine vehicle, a source of fluid fuel for the engine, a source of fluid oxidant for supporting combustion of the engine fuel, pressure means for severally supplying fuel and oxidant to the engine from their respective sources, and means jointly responsive to the speed of said engine and the pressure of the water surrounding the vehicle and interposed between said engine and at least one of said sources for regulating the supply of the corresponding fluid to said engine.

2. In combination with a combustion engine for propelling a submarine vehicle, a source of fluid fuel for the engine, a source of fluid oxidant for supporting combustion of the engine fuel, pressure means for severally supplying fuel and oxidant to the engine from their respective sources, and means jointly responsive to the speed of said engine and the pressure of the water surrounding the vehicle and interposed between said engine and each of said sources for regulating the supply of the corresponding fluids to said engine.

3. In combination with a combustion engine for propelling a submarine vehicle, a collapsible container constituting a source of fluid fuel for the engine, a collapsible container constituting a source of fluid oxidant for supporting combustion of the engine fuel, pressure means applied to said containers for severally supplying fuel and oxidant to the engine from their respective sources, and means jointly responsive to the speed of said engine and the pressure of the water surrounding the vehicle and interposed between said engine and at least one of said sources for regulating the supply of the corresponding fluid to said engine.

4. In combination with a combustion engine for propelling a submarine vehicle, a collapsible container constituting a source of fluid fuel for the engine, a collapsible container constituting a source of fluid oxidant for supporting combustion of the engine fuel, pressure means applied to said containers for severally supplying fuel and oxidant to the engine from their respective sources, and means jointly responsive to the speed of said engine and the pressure between said engine and each of said sources for regulating the supply of the corresponding fluids to said engine.

5. In combination with a combustion engine for propelling a submarine vehicle, a source of fluid fuel for the engine, a source of fluid oxidant for supporting combustion of the engine fuel, pressure means driven by said engine for severally supplying fuel and oxidant to the engine from their respective sources, and means jointly responsive to the speed of said engine and the pressure of the water surrounding the vehicle and interposed between said engine and at least one of said sources for regulating the supply of the corresponding fluid to said engine.

6. In combination with a combustion engine for propelling a submarine vehicle, a source of fluid fuel for the engine, a source of fluid oxidant for supporting combustion of the engine fuel, pressure means driven by said engine for severally supplying fuel and oxidant to the engine from their respective sources, pressure regulating means for maintaining constant the output pressure of said pressure means, and means jointly responsive to the speed of said engine and the pressure of the water surrounding the vehicle and interposed between said engine and at least one of said sources for regulating the supply of the corresponding fluid to said engine.

7. In combination with a combustion engine for propelling a submarine vehicle, a source of fluid fuel for the engine, a source of fluid oxidant for supporting combustion of the fuel in said engine, pressure means for supplying the fuel to said engine, a preburner communicating with the combustion space of said engine, pressure means for supplying the oxidant from its source to said preburner, means for supplying a predetermined quantity of fuel from said fuel source to said preburner for combustion in part of the oxidant therein to preheat the oxidant therein to the autoignition temperature of the fuel in said engine, and means jointly responsive to the speed of said engine and the pressure of the water surrounding the vehicle for regulating the supply of oxidant to said engine.

8. In combination with a combustion engine for propelling a submarine vehicle, a source of fluid fuel for the engine, a source of fluid oxidant for supporting combustion of the fuel in said engine, pressure means for supplying the fuel to said engine, a preburner communicating with the combustion space of said engine, pressure means for supplying the oxidant from its source to said preburner, means for supplying a predetermined quantity of fuel from said fuel source to said preburner for combustion in part of the oxidant therein to preheat the oxidant therein to the autoignition temperature of the fuel in said engine, and means jointly responsive to the speed of said engine and the pressure of the water surrounding the vehicle for regulating the supply of fuel to said engine.

9. In combination with a combustion engine for propelling a submarine vehicle, a source of fluid fuel for the engine, a source of fluid oxidant for supporting combustion of the fuel in said engine, pressure means for supplying the fuel to said engine, a preburner communicating with the combustion space of said engine, pressure means for supplying the oxidant from its source to said preburner, means for supplying a predetermined quantity of fuel from said fuel source to said preburner for combustion in part of the oxidant therein to preheat the oxidant therein to the autoignition temperature of the fuel in said engine, and means jointly responsive to the speed of said engine and the pressure of the water surrounding the vehicle for regulating the supply of oxidant and fuel to said engine.

10. In combination with a combustion engine for propelling a submarine vehicle, a collapsible container constituting a source of fluid fuel for the engine, a collapsible container constituting a source of fluid oxidant for supporting combustion of the fuel in said engine, pressure means applied to the corresponding container for supplying the fuel to said engine, a preburner communicating with the combustion space of said engine, pressure means applied to the corresponding container for supplying the oxidant from its source to said preburner, means for supplying a predetermined quantity of fuel from said fuel source to said preburner for combustion in part of the oxidant therein to preheat the oxidant therein to the autoignition temperature of the fuel in said engine, and means jointly responsive to the speed of said engine and the pressure of the water surrounding the vehicle for regulating the supply of oxidant and fuel to said engine.

11. In combination with a combustion engine for propelling a submarine vehicle, a source of fuel, means for supplying fuel from said source to the engine, a source of hydrogen peroxide, means for supplying hydrogen peroxide from its source to the engine, a catalyst chamber interposed in said last-named supplying means for decomposing the hydrogen peroxide prior to introducing the same into said engine, and means jointly responsive to the speed of said engine and the pressure of the water surrounding the vehicle and interposed in said supply means for regulating the supply of fuel and hydrogen peroxide to said engine.

12. In combination with a combustion engine for propelling a submarine vehicle, a source of fuel, means for supplying fuel from said source to the engine, a source of hydrogen peroxide, means for supplying hydrogen peroxide from its source to the engine, a catalyst chamber interposed in said last-named supplying means for decomposing the hydrogen peroxide prior to introducing the same into said engine, and means jointly responsive to the speed of said engine and the pressure of the water surrounding the vehicle and interposed in said supply means for regulating the supply of fuel and hydrogen peroxide to said engine.

13. In combination with a combustion engine for propelling a submarine vehicle, a source of fuel, means for supplying fuel from said source to the engine, a source of hydrogen peroxide, means for supplying hydrogen peroxide from its source to the engine, a catalyst chamber interposed in said last-named supplying means for decomposing the hydrogen peroxide prior to introducing the same into said engine, a burner interposed in said last-named supplying means, and a connection between said fuel supply means and said burner for burning fuel in part of the oxygen of said decomposition products for preheating the hydrogen peroxide decomposition products to the autoignition temperature of the fuel in said engine.

14. In combination with a combustion engine for propelling a submarine vehicle, a collapsible container of hydrogen peroxide, a tank enclosing said container, a conduit leading from said container to the engine, a source of fluid pressure connected to said tank for applying external pressure to said container to cause the hydrogen peroxide to flow through said conduit to the engine, and means in said conduit and jointly responsive to the speed of the engine and the pressure of the water surrounding the vehicle for regulating the supply of hydrogen peroxide to the engine.

15. In combination with a combustion engine for propelling a submarine vehicle, a collapsible container of hydrogen peroxide, a tank enclosing said container, a catalytic chamber leading to the engine for decomposing hydrogen peroxide, a conduit leading from said container to said catalytic chamber, a source of fluid pressure connected to said tank for applying external pressure to said container to cause the hydrogen peroxide to flow through said conduit to said catalytic chamber, and means in said conduit and jointly responsive to the speed of the engine and the pressure of the water surrounding the vehicle for regulating the supply of hydrogen peroxide to said catalytic chamber.

16. In combination with a combustion engine for propelling a submarine vehicle, a collapsible container of hydrogen peroxide, a tank enclosing said container, a conduit leading from said container to the engine, a source of fluid pressure connected to said tank for applying external pressure to said container to cause the hydrogen peroxide to flow through said conduit to the engine, means responsive to the pressure of the water surrounding the vehicle and interposed between said fluid pressure source and said tank for regulating the pressure therein, and means in said conduit and jointly responsive to the speed of the engine and the pressure of the water surrounding the vehicle for regulating the supply of hydrogen peroxide to the engine.

17. In combination with a combustion engine for propelling a submarine vehicle, a collapsible container of hydrogen peroxide, a tank enclosing said container, a conduit leading from said container to the engine, a source of fluid pressure connected to said tank for applying external pressure to said container to cause the hydrogen peroxide to flow through said conduit to the engine, a valve interposed in the connection between said fluid pressure source and said tank for regulating the pressure therein, and means in said conduit and jointly responsive to the speed of the engine and the pressure of the water surrounding the vehicle for regulating the supply of hydrogen peroxide to the engine.

18. In combination with a combustion engine for propelling a submarine vehicle, a collapsible container of hydrogen peroxide, a collapsible container for fuel, a collapsible container for lubricant, a tank enclosing each container, a conduit leading from each container to the engine, a source of fluid pressure connected to each tank for applying external pressure to each container to cause the contents thereof to flow through said conduit to the engine, means in the oxidant conduit jointly responsive to the speed of the engine and the pressure of the water surrounding the vehicle for regulating the supply of hydrogen peroxide to the engine, and means in the fuel conduit responsive to the pressure of water surrounding the vehicle for regulating the supply of fuel to the engine.

References Cited in the file of this patent

UNITED STATES PATENTS

| | | |
|---|---|---|
| 1,881,425 | Ferguson | Oct. 11, 1932 |
| 2,229,714 | Wirrer | Jan. 28, 1941 |
| 2,325,619 | Lysholm | Aug. 3, 1943 |
| 2,408,111 | Truax et al. | Sept. 24, 1946 |

FOREIGN PATENTS

| | | |
|---|---|---|
| 248,547 | Germany | June 25, 1912 |